June 26, 1934.  F. H. PIETZSCH ET AL  1,964,138
BRAKE SLACK ADJUSTER
Filed Dec. 24, 1931
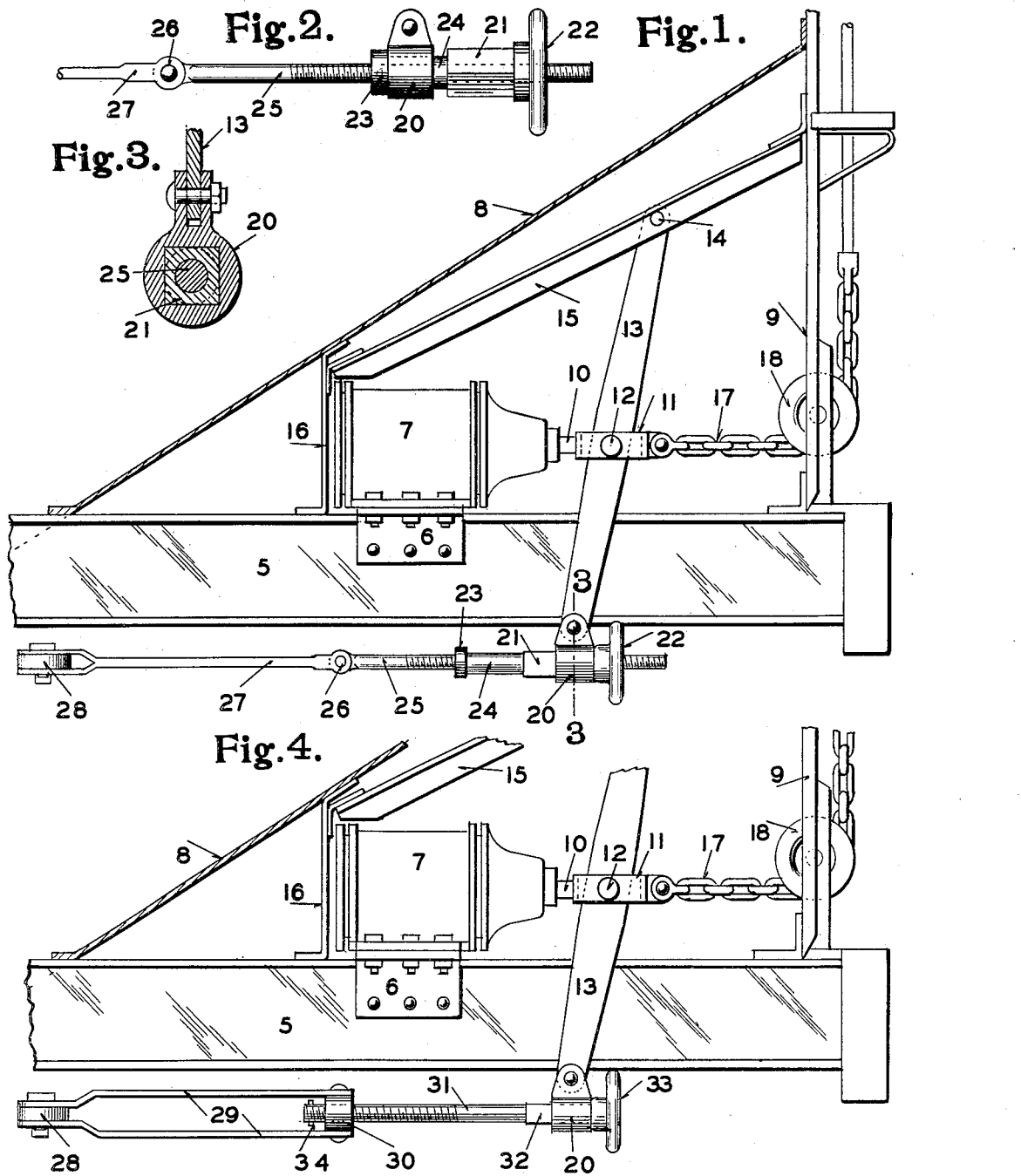
Inventors
F. H. Pietzsch
S. H. Campbell
By E. E. Huffman
Att'y.

Patented June 26, 1934

1,964,138

UNITED STATES PATENT OFFICE 1,964,138

BRAKE SLACK ADJUSTER

Frank H. Pietzsch and Sterling H. Campbell, St. Louis, Mo., assignors to Railway Devices Company, St. Louis, Mo., a corporation of Missouri Application December 24, 1931, Serial No. 582,955

6 Claims. (Cl. 188—197)

Our invention relates to a brake slack adjuster and particularly to an adaptation for use in connection with the braking system of a hopper car of a type of slack adjuster, the more general application of which is described and claimed in our copending application of even date herewith.

One object of our invention is to so locate the adjuster that it may be used in a braking system in which the brake cylinder is located between the inclined bottom of a hopper car and the under frame and operating the brake through the medium of a cylinder lever having a fixed pivot adjacent said inclined bottom.

Another object of our invention is to provide the slack adjusting mechanism with means for insuring the introduction into the connections of a predetermined minimum amount of slack so as to prevent the dragging of the brake shoes on the wheels when the brakes are released.

In the accompanying drawing, which illustrates two forms of slack adjuster made in accordance with our invention, Figure 1 is a side view, partly in section, of a portion of a hopper car to which one form of our device is applied; Figure 2 is a side view of the adjuster in a different position; Figure 3 is an enlarged section taken on the line 3—3 of Figure 1; and Figure 4 is a view similar to Figure 1 but showing another form of adjuster.

Referring first to Figure 1, the under frame of the car, indicated by the numeral 5, carries, by means of a bracket 6, the brake cylinder 7 located between the under frame and the inclined end portion 8 of the hopper bottom. This inclined portion extends from the under frame to an upright support 9. The cylinder push-rod 10 is pivoted through a yoke 11 to a point 12 intermediate the ends of the cylinder lever 13. The fixed end of the lever is pivoted at 14 to a strut 15 extending from the upright 9 to a second upright 16 positioned between the under frame and the inclined bottom. A chain 17 attached to the yoke 11 extends over a sheave 18 and thence to the hand brake mechanism, not shown, so that the brakes may be applied either by power or manually.

Pivoted to the free end of the cylinder lever is a sleeve 20, the opening through which is square or of other non-circular cross section. Positioned in this opening is a correspondingly shaped portion 21 of a tubular member having on one end a hand wheel 22 and on the other a stop collar 23. Between the square portion 21 and the stop, the tubular member is provided with a round portion 24 adapted to rotate on the sleeve 20 when the slack is being taken up. The interior of the tubular member is threaded to receive the threaded end of a bar 25 pivoted at 26 to a bar 27. These two bars, together with the tubular member, form an adjustable top rod for connecting the free end of the cylinder lever to one end of the first lever 28 of the brake lever system. As the brake lever system may be of any of the usual forms, it has not been illustrated. It will be understood that either the collar 23 or the wheel 22 must be made removable to permit the assembly of the parts.

In Figure 4 we have shown a modification in which a section of the top rod itself, rather than a surrounding tubular member, is rotated to take up the slack. In the modification the bar 27 is replaced by a pair of straps 29 between the ends of which is carried a swiveled nut 30 threaded to receive the end of a threaded bar 31 having a square portion 32 entering the sleeve 20 and provided with a hand wheel 33. A pin 34 may be placed in the end of the bar 31 to prevent its disengagement from the nut.

In order to adjust the brake, the hand wheel is grasped and the top rod moved longitudinally until the square portion is withdrawn from the sleeve. The hand wheel is now rotated until all the slack is removed from the connections. The square portion is then allowed to re-enter the sleeve and thus introduce into the connections the desired minimum of slack which is determined by the length of the square portion. While the square portion is in position in the sleeve, the adjusting member cannot rotate, so that change of adjustment due to vibration of the parts, is avoided.

Having fully described our invention, what we claim as new and desire to secure by Letters Patent of the United States is:

1. In a device of the class described, the combination with a car under frame, of a hopper body carried by said frame and having an inclined wall, a cylinder mounted adjacent said wall, a pivoted cylinder lever actuated from said cylinder, a brake lever system, and a connector extending between the free end of said cylinder lever and said brake lever system, said connector including manually operated adjusting means and means for introducing a predetermined minimum of slack into the system.

2. In a device of the class described, a railway car of the hopper type, a brake cylinder located adjacent to the wall of the hopper, a cylinder lever actuated from said cylinder, said lever having a fixed and a free end, a brake system, a slack adjusting device comprising two relatively rotatable parts moving with the free end of the lever manually-operated means for rotating one of said parts to take up slack, said slack adjusting device including means for introducing a predetermined minimum of slack into the system, and operating connections extending from the slack adjusting device to the brake system.

3. In a device of the class described, the combination with a car under frame, of a hopper body carried by said frame and having an inclined wall, a cylinder mounted adjacent said wall, a pivoted cylinder lever actuated from said cylinder, a brake lever system, and a connector extending between the free end of said cylinder lever and the brake lever system, said connector including two parts having threaded engagement, one of said parts being rotatable to take up the slack, said rotatable part having longitudinal non-rotary movement to introduce a predetermined minimum of slack into the system.

4. In a device of the class described, the combination with a car under frame, of a hopper body carried by said frame and having an inclined wall, a cylinder mounted adjacent said wall, a pivoted cylinder lever actuated from said cylinder, a brake lever system, a sleeve carried on the free end of said cylinder lever and having a non-circular opening therethrough, a connector attached to said brake lever system, said connector comprising two parts having threaded engagement to vary the effective length of the connector, one of said parts having a non-circular portion movable into and out of said sleeve to introduce a predetermined minimum of slack into the system and to prevent change of adjustment when the parts are in normal position.

5. In a device of the class described, the combination with a car under frame, of a hopper body carried by said frame and having an inclined wall, a cylinder mounted adjacent said wall, a pivoted cylinder lever actuated from said cylinder, a brake lever system, a sleeve carried on the free end of the cylinder lever and having a non-circular opening therethrough, a top rod connected to said brake lever system and having a threaded portion, and a tubular member engaging the threaded portion, said tubular member having a non-circular portion movable into and out of said sleeve to introduce a predetermined minimum of slack into the system and to prevent rotation of the tubular member when the parts are in normal position.

6. In a device of the class described, the combination with a car under frame, of a hopper body carried by said frame and having an inclined wall, a cylinder mounted adjacent said wall, a pivoted cylinder lever actuated from said cylinder, a brake lever system, a sleeve carried on the free end of the cylinder lever and having a non-circular opening therethrough, a top rod comprising two parts, one of said parts being connected to the brake lever system, a nut carried by said part, the other of said parts having threaded engagement with said nut and being provided with a non-circular portion movable into and out of engagement with said sleeve to introduce a predetermined minimum of slack into the system and to prevent change of adjustment when the parts are in normal position.

FRANK H. PIETZSCH.
STERLING H. CAMPBELL.